(12) United States Patent
Du et al.

(10) Patent No.: US 10,479,278 B2
(45) Date of Patent: Nov. 19, 2019

(54) VEHICLE AND VEHICLE STEP APPARATUS

(71) Applicant: T-MAX (HANGZHOU) TECHNOLOGY CO., LTD., Hangzhou (CN)

(72) Inventors: Xinfa Du, Hangzhou (CN); Qi Zhang, Hangzhou (CN); Yiming Wang, Hangzhou (CN)

(73) Assignee: T-MAX (HANGZHOU) TECHNOLOGY CO., LTD, Hangzhou (CN)

( * ) Notice: Subject to any disclaimer, the term of this patent is extended or adjusted under 35 U.S.C. 154(b) by 420 days.

(21) Appl. No.: 15/200,940

(22) Filed: Jul. 1, 2016

(65) Prior Publication Data
US 2017/0036607 A1 Feb. 9, 2017

(30) Foreign Application Priority Data

Aug. 4, 2015 (CN) .......................... 2015 1 0468824
Aug. 4, 2015 (CN) .......................... 2015 1 0469324
(Continued)

(51) Int. Cl.
*B60R 3/02* (2006.01)

(52) U.S. Cl.
CPC ..................................... *B60R 3/02* (2013.01)

(58) Field of Classification Search
CPC ..... B60R 3/00; B60R 3/02; E06C 5/18; E06C 5/22
See application file for complete search history.

(56) References Cited

U.S. PATENT DOCUMENTS 694,572 A 3/1902 Peyton et al.
752,031 A 2/1904 Chadwick
(Continued)

FOREIGN PATENT DOCUMENTS

CN 101381060 A 3/2009
CN 101497325 A 8/2009
(Continued)

OTHER PUBLICATIONS

International Search Report and Written Opinion of the International Searching Authority for PCT International Application No. PCT/CN2015/097927 dated Apr. 13, 2016 (13 pages).
(Continued)

*Primary Examiner* — Frank B Vanaman
(74) *Attorney, Agent, or Firm* — Howard & Howard Attorneys PLLC

(57) ABSTRACT

A vehicle step apparatus including a first extending and retracting device having a first mounting bracket, a first step bracket, and a first arm assembly configured to drive the first step bracket to move between a first extending position and a first retracting position; a second extending and retracting device comprising a second mounting bracket, a second step bracket, and a second arm assembly configured to drive the second step bracket to move between a second extending position and a second retracting position; a step mounted on the first and second step bracket; a first permanent magnet direct current motor mounted on the first mounting bracket and coupled with the first arm assembly to drive the first arm assembly; and a second permanent magnet direct current motor mounted on the second mounting bracket and coupled with the second arm assembly to drive the second arm assembly.

12 Claims, 7 Drawing Sheets

(30) Foreign Application Priority Data

| Aug. 4, 2015 | (CN) | 2015 2 0576675 U |
| Aug. 4, 2015 | (CN) | 2015 2 0580148 U |
| Oct. 30, 2015 | (CN) | 2015 1 0731518 |
| Oct. 30, 2015 | (CN) | 2015 2 0860004 U |

(56) References Cited

U.S. PATENT DOCUMENTS

| | | |
|---|---|---|
| 2,125,085 A * | 7/1938 | Pool .................... B60R 3/02 105/437 |
| 4,068,542 A | 1/1978 | Brand et al. |
| 4,275,664 A | 6/1981 | Reddy |
| 6,135,472 A | 10/2000 | Wilson et al. |
| 6,435,534 B1 | 8/2002 | Stone |
| 6,533,303 B1 | 3/2003 | Watson |
| 6,557,911 B2 | 5/2003 | Nelsen et al. |
| 6,834,875 B2 | 12/2004 | Leitner et al. |
| 6,840,526 B2 | 1/2005 | Anderson et al. |
| 6,955,370 B2 | 10/2005 | Fabiano et al. |
| 6,990,873 B2 | 1/2006 | Rennen et al. |
| 7,007,961 B2 | 3/2006 | Leitner et al. |
| 7,128,191 B2 | 10/2006 | Fisher |
| 7,163,221 B2 | 1/2007 | Leitner |
| 7,367,574 B2 | 5/2008 | Leitner |
| 7,637,519 B2 | 12/2009 | Leitner et al. |
| 7,740,260 B2 | 6/2010 | VanBelle et al. |
| 7,740,261 B2 | 6/2010 | Leitner et al. |
| 7,775,473 B2 | 8/2010 | Mori |
| 7,976,042 B2 | 7/2011 | Watson et al. |
| 8,042,821 B2 | 10/2011 | Yang et al. |
| 8,052,162 B2 | 11/2011 | Yang et al. |
| 8,056,913 B2 | 11/2011 | Kuntze et al. |
| 8,146,935 B1 * | 4/2012 | Adams .................... B60R 3/02 280/164.1 |
| 8,469,380 B2 | 6/2013 | Yang et al. |
| 8,544,811 B2 | 10/2013 | Theis et al. |
| 8,662,512 B2 | 3/2014 | May |
| 8,668,217 B2 | 3/2014 | Ziaylek et al. |
| D713,772 S | 9/2014 | Ziaylek et al. |
| 8,870,207 B2 | 10/2014 | Parvey |
| 9,176,517 B2 | 11/2015 | Pelletier et al. |
| 9,205,781 B1 | 12/2015 | May |
| 9,346,405 B2 | 5/2016 | Leitner et al. |
| 2002/0096889 A1 | 7/2002 | Nelsen et al. |
| 2003/0038446 A1 * | 2/2003 | Anderson ................. B60R 3/02 280/166 |
| 2003/0094781 A1 | 5/2003 | Jaramillo et al. |
| 2003/0132595 A1 | 7/2003 | Fabiano et al. |
| 2004/0108678 A1 * | 6/2004 | Berkebile ............... B60R 3/002 280/166 |
| 2005/0035568 A1 * | 2/2005 | Lee .................... B60R 3/002 280/166 |
| 2005/0173886 A1 | 8/2005 | Leitner |
| 2006/0181049 A1 | 8/2006 | Kobayashi et al. |
| 2006/0214386 A1 | 9/2006 | Watson |
| 2006/0219484 A1 * | 10/2006 | Ogura .................... B60K 25/10 185/39 |
| 2008/0042396 A1 | 2/2008 | Watson et al. |
| 2008/0100023 A1 | 5/2008 | Ross et al. |
| 2008/0157500 A1 | 7/2008 | Raley et al. |
| 2008/0179920 A1 | 7/2008 | Watson |
| 2009/0250896 A1 | 10/2009 | Watson |
| 2009/0295114 A1 | 12/2009 | Yang et al. |
| 2009/0295115 A1 * | 12/2009 | Yang .................... B60R 3/02 280/166 |
| 2010/0044993 A1 | 2/2010 | Watson |
| 2010/0102288 A1 | 4/2010 | Yang et al. |
| 2012/0025485 A1 | 2/2012 | Yang et al. |
| 2012/0098231 A1 | 4/2012 | Huotari et al. |
| 2013/0154230 A1 | 6/2013 | Ziaylek et al. |
| 2013/0234488 A1 | 9/2013 | Pleskot |
| 2015/0123374 A1 | 5/2015 | Smith |
| 2015/0137527 A1 | 5/2015 | Hattori |
| 2015/0197199 A1 | 7/2015 | Kuo |
| 2015/0274079 A1 | 10/2015 | Yang et al. |
| 2016/0039346 A1 | 2/2016 | Yang et al. |
| 2016/0262969 A1 | 9/2016 | Ohta et al. |
| 2017/0021781 A1 | 1/2017 | Du et al. |
| 2017/0036605 A1 | 2/2017 | Du et al. |
| 2017/0036606 A1 | 2/2017 | Du et al. |
| 2017/0036608 A1 | 2/2017 | Du et al. |

FOREIGN PATENT DOCUMENTS

| | | |
|---|---|---|
| CN | 201901077 U | 7/2011 |
| CN | 101279594 B | 8/2011 |
| CN | 102416907 A | 4/2012 |
| CN | 202806578 U | 3/2013 |
| CN | 202806580 U | 3/2013 |
| CN | 203211209 U | 9/2013 |
| CN | 103909871 A | 7/2014 |
| CN | 104192070 A | 12/2014 |
| CN | 104285079 A | 1/2015 |
| CN | 204149942 U | 2/2015 |
| CN | 104385989 A | 3/2015 |
| CN | 204659599 U | 9/2015 |
| CN | 105083136 A | 11/2015 |
| CN | 105083137 A | 11/2015 |
| CN | 204801649 U | 11/2015 |
| CN | 105128751 A | 12/2015 |
| CN | 204895311 U | 12/2015 |
| CN | 204915491 U | 12/2015 |
| CN | 205344528 U | 6/2016 |
| JP | H0891127 A | 4/1996 |
| JP | 2006199200 A | 8/2006 |
| KR | 100821687 B1 | 4/2008 |
| WO | 2006050297 A2 | 5/2006 |

OTHER PUBLICATIONS

First Office Action for Chinese Patent Application No. 201510468824.6 dated Nov. 28, 2016 (13 pages).

First Office Action for Chinese Patent Application No. 201510469324.4 dated Nov. 28, 2016 (16 pages).

International Search Report and Written Opinion of the International Searching Authority for PCT International Application No. PCT/CN2015/100159 dated May 13, 2016 (13 pages).

First Office Action for Chinese Patent Application No. 201510731518.7 dated May 3, 2017 (19 pages).

Second Office Action for Chinese Patent Application No. 201510468824.6 dated May 15, 2017 (10 pages).

Non-Final Office Action for U.S. Appl. No. 15/200,830 dated Nov. 30, 2017.

Communication for European Patent Application No. 15900290.6 dated Jun. 19, 2018 transmitting the Extended European Search Report dated Jun. 12, 2018.

Examination Report No. 1 for Australian Patent Application No. 2015404902 dated Aug. 7, 2018.

Non-Final Office Action for U.S. Appl. No. 141929,720 dated May 31, 2016.

Non-Final Office Action for U.S. Appl. No. 14/929,699 dated Oct. 21, 2016.

* cited by examiner

VEHICLE AND VEHICLE STEP APPARATUS

CROSS-REFERENCE TO RELATED APPLICATIONS

The present application claims priority to and all the benefits of Chinese Patent Application 201510731518.7 filed on Oct. 30, 2015, Chinese Patent Application 201520860004.7 filed on Oct. 30, 2015, Chinese Patent Application 201510468824.6 filed on Aug. 4, 2015, Chinese Patent Application 201520576675.0 filed on Aug. 4, 2015, Chinese Patent Application 201510469324.4 filed on Aug. 4, 2015, and Chinese Patent Application 201520580148.7 filed on Aug. 4, 2015, all of which are hereby expressly incorporated herein by reference in their entirety.

BACKGROUND OF THE INVENTION

1. Field of the Invention

Embodiments of the present invention generally relate to the field of vehicle, and more particularly, to a vehicle and a vehicle step apparatus.

2. Description of the Related Art

In relative art, a vehicle step apparatus of a vehicle uses a driving mechanism (with motor) and a driven mechanism (without motor) to drive a step to move. That is to say, the vehicle step apparatus uses one motor to drive the step to move. Thus, all of load is borne by the one motor, such that the load of the one motor is very high. Thus, a requirement for performance of the one motor is very high, a manufacturing difficulty, a manufacturing cost and a failure rate of the one motor are increased and a working life of the one motor is shortened.

Moreover, because the driving mechanism has a function of self-lock and the driven mechanism does not have a function of self-lock, the driven mechanism is easy to droop, especially when the step is very long.

SUMMARY OF THE INVENTION

The present invention seeks to solve at least one of the technical problems existing in the related art. Accordingly, a first aspect of the present invention provides a vehicle step apparatus.

A second aspect of the present invention provides a vehicle, which includes the above vehicle step apparatus.

Embodiments of a first aspect of the present invention provide a vehicle step apparatus, including: a first extending and retracting device comprising a first mounting bracket, a first step bracket, and a first arm assembly coupled between the first mounting bracket and the first step bracket and configured to drive the first step bracket to move between a first extending position and a first retracting position; a second extending and retracting device comprising a second mounting bracket, a second step bracket, and a second arm assembly coupled between the second mounting bracket and the second step bracket and configured to drive the second step bracket to move between a second extending position and a second retracting position; a step mounted on the first step bracket and the second step bracket; a first permanent magnet direct current motor mounted on the first mounting bracket and coupled with the first arm assembly to drive the first arm assembly; and a second permanent magnet direct current motor mounted on the second mounting bracket and coupled with the second arm assembly to drive the second arm assembly.

With the vehicle step apparatus according to embodiments of the first aspect of the present invention, the vehicle step apparatus is low in manufacturing cost, low in failure rate, and long in working life, has good synchronization, and drooping of the vehicle step apparatus can be prevented.

Embodiments of a second aspect of the present invention provide a vehicle, including: a first extending and retracting device comprising a first mounting bracket, a first step bracket, and a first arm assembly coupled between the first mounting bracket and the first step bracket and configured to drive the first step bracket to move between a first extending position and a first retracting position; a second extending and retracting device comprising a second mounting bracket, a second step bracket, and a second arm assembly coupled between the second mounting bracket and the second step bracket and configured to drive the second step bracket to move between a second extending position and a second retracting position; a step mounted on the first step bracket and the second step bracket; a first permanent magnet direct current motor mounted on the first mounting bracket and having a first motor shaft coupled with the first arm assembly; and a second permanent magnet direct current motor mounted on the second mounting bracket and having a second motor shaft coupled with the second arm assembly.

The vehicle is low in manufacturing cost, low in failure rate, and long in working life.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
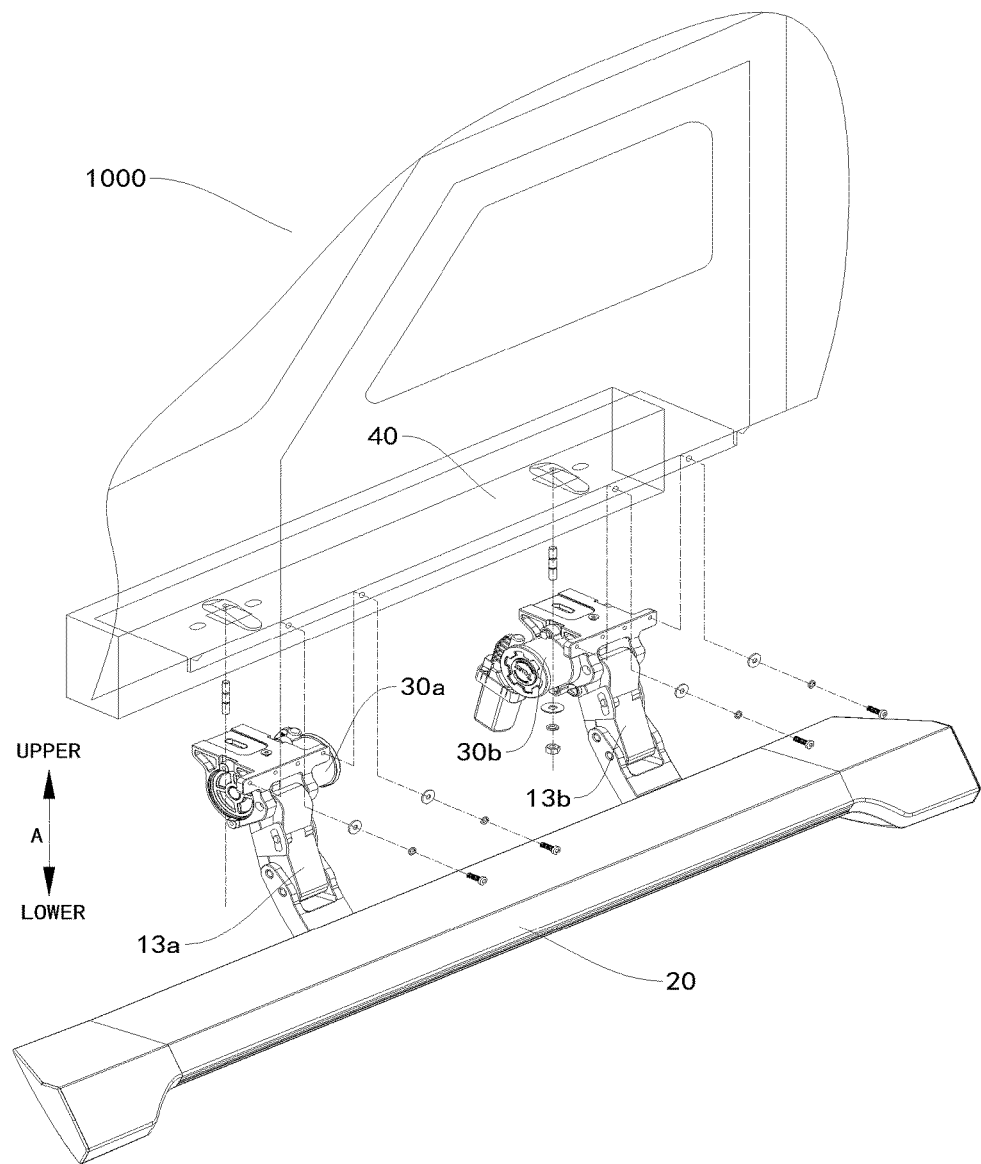
FIG. 1 is a partial exploded view of a vehicle according to an embodiment of the present invention.

Reference will be made in detail to embodiments of the present invention. Embodiments of the present invention are shown in drawings, in which the same or similar members and the members having same or similar functions are denoted by like reference numerals throughout the descriptions. The embodiments described herein according to drawings are explanatory and illustrative, not construed to limit the present invention.

The following description provides a plurality of embodiments or examples configured to achieve different structures of the present invention. In order to simplify the publication of the present invention, components and dispositions of the particular embodiment are described in the following, which are only explanatory and not construed to limit the present invention. In addition, the present invention may repeat the reference number and/or letter in different embodiments for the purpose of simplicity and clarity, and the repetition does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present invention, unless specified or limitation otherwise, it should be noted that, terms "mounted," "coupled" and "coupled" may be understood broadly, such as electronic connection or mechanical connection, inner communication between two members, direct connection or indirect connection via intermediary. Those having ordinary skills in the art should understand the specific meanings in the present invention according to specific situations.

A vehicle 1000 according to embodiments of the present invention will be described with reference to the drawings.

As shown in FIGS. 1-6, the vehicle 1000 according to embodiments of the present invention includes a chassis 40 and a vehicle step apparatus 100. The vehicle step apparatus 100 includes a first extending and retracting device 10a, a second extending and retracting device 10b, a step 20, a first permanent magnet direct current motor 30a and a second permanent magnet direct current motor 30b.

The first extending and retracting device 10a includes a first mounting bracket 11a, a first step bracket 12a and a first arm assembly 13a. The first arm assembly 13a is coupled between the first mounting bracket 11a and the first step bracket 12a and configured to drive the first step bracket 12a to move between a first extending position and a first retracting position. The first mounting bracket 11a is mounted on the chassis 40.

The second extending and retracting device 10b includes a second mounting bracket 11b, a second step bracket 12b and a second arm assembly 13b. The second arm assembly 13b is coupled between the second mounting bracket 11b and the second step bracket 12b and configured to drive the second step bracket 12b to move between a second extending position and a second retracting position. The second mounting bracket 11b is mounted on the chassis 40.

The step 20 is mounted on the first step bracket 12a and the second step bracket 12b. The first permanent magnet direct current motor 30a is mounted on the first mounting bracket 11a and coupled with the first arm assembly 13a to drive the first arm assembly 13a. The second permanent magnet direct current motor 30b is mounted on the second mounting bracket 11b and coupled with the second arm assembly 13b to drive the second arm assembly 13b.

In some embodiments, the first permanent magnet direct current motor 30a has a first motor shaft 32a coupled with the first arm assembly 13a. The second permanent magnet direct current motor 30b has a second motor shaft 32b coupled with the second arm assembly 13b.

Thus, the first step bracket 12a is driven to move between the first extending position and the first retracting position by the first permanent magnet direct current motor 30a via the first arm assembly 13a, and the second step bracket 12b is driven to move between the second extending position and the second retracting position by the second permanent magnet direct current motor 30b via the second arm assembly 13b. In other words, the vehicle 1000 uses the first permanent magnet direct current motor 30a and the second permanent magnet direct current motor 30b to drive the step 20 to extend and retract.

The vehicle 1000 uses two motors, i.e. the first permanent magnet direct current motor 30a and the second permanent magnet direct current motor 30b, to drive the step 20 to extend and retract, thus a load applied to the vehicle step apparatus 100 is distributed to the first permanent magnet direct current motor 30a and the second permanent magnet direct current motor 30b.

Thus, comparing to the vehicle step apparatus 100 employing only one motor, the load of the first permanent magnet direct current motor 30a is decreased so as to decrease a failure rate of the first permanent magnet direct current motor 30a, and the load of the second permanent magnet direct current motor 30b is decreased so as to decrease a failure rate of the second permanent magnet direct current motor 30b, thus prolonging a working life of the first permanent magnet direct current motor 30a and a working life of the second permanent magnet direct current motor 30b.

Because the load of the first permanent magnet direct current motor 30a is low, a requirement for performance of the first permanent magnet direct current motor 30a is decreased so as to lower a manufacturing difficulty and a manufacturing cost of the first permanent magnet direct current motor 30a.

Similarly, the load of the second permanent magnet direct current motor 30b is low, a requirement for performance of the second permanent magnet direct current motor 30b is decreased so as to lower a manufacturing difficulty and a manufacturing cost of the second permanent magnet direct current motor 30b.

Because both the first permanent magnet direct current motor 30a and the second permanent magnet direct current motor 30b have a function of self-lock, even the step 20 is very long, both the first permanent magnet direct current motor 30a and the second permanent magnet direct current motor 30b can be prevented from drooping.

Additionally, for the first permanent magnet direct current motor 30a and the second permanent magnet direct current motor 30b, a rotational speed is related to a load. Thus, a rotational speed of a motor will be decreased due to an increasing load, and a rotational speed of a motor will be increased due to a decreasing load.

Thus, a rotational speed of the first permanent magnet direct current motor 30a is dynamically balanced with a rotational speed of the second permanent magnet direct current motor 30b, so as to realize a synchronized motion of the first extending and retracting device 10a and the second extending and retracting device 10b.

Thus, the vehicle step apparatus 100 according to embodiments of the present invention is low in manufacturing cost, low in failure rate, long in working life, and has good synchronization, and the vehicle step apparatus 100 can be prevented from drooping.

As shown in FIG. 1, in some embodiments, the vehicle 1000 includes the chassis 40 and the vehicle step apparatus 100. The vehicle step apparatus 100 includes the first extending and retracting device 10a, the second extending and retracting device 10b, the step 20, the first permanent magnet direct current motor 30a and the second permanent magnet direct current motor 30b.

The first extending and retracting device 10a includes the first mounting bracket 11a, the first step bracket 12a and the first arm assembly 13a. The first mounting bracket 11a is mounted on the chassis 40. The first step bracket 12a is used to mount the step 20. The first arm assembly 13a is coupled between the first mounting bracket 11a and the first step bracket 12a and configured to drive the first step bracket 12a to move between the first extending position and the first retracting position.

The second extending and retracting device 10b includes the second mounting bracket 11b, the second step bracket 12b and the second arm assembly 13b. The second mounting bracket 11b is mounted on the chassis 40. The second step bracket 12b is used to mount the step 20. The second arm assembly 13b is coupled between the second mounting bracket 11b and the second step bracket 12b and configured to drive the second step bracket 12b to move between the second extending position and the second retracting position.

Both the first mounting bracket 11a and the second mounting bracket 11b may be mounted on the chassis 40 in well-known manner. The step 20 is mounted on the first step bracket 12a and the second step bracket 12b by known means.

As shown in FIG. 1, the first arm assembly 13a includes a plurality of arms pivotally connected together. At least one arm of the first arm assembly 13a is coupled with the first mounting bracket 11a, and at least one arm of the first arm assembly 13a is coupled with the first step bracket 12a.

As shown in FIG. 1, the second arm assembly 13b includes a plurality of arms pivotally connected together. At least one arm of the second arm assembly 13b is coupled with the second mounting bracket 11b, and at least one arm of the second arm assembly 13b is coupled with the second step bracket 12b.

Figure 5:
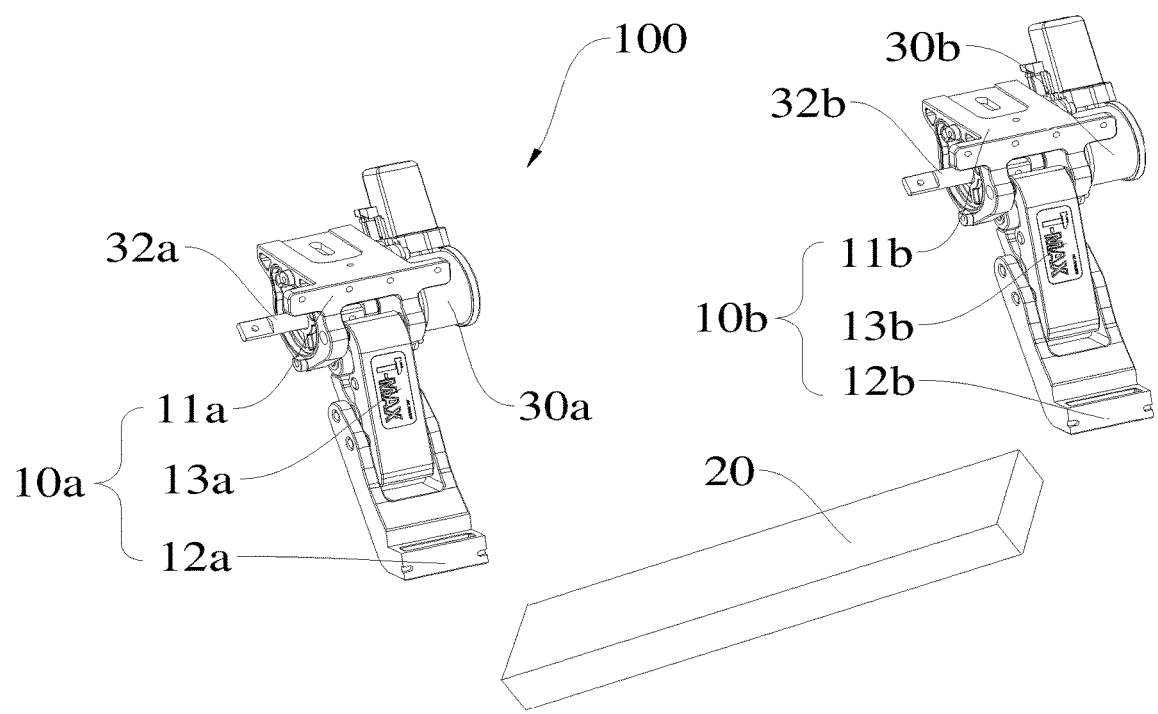
FIG. 5 is a schematic view of a vehicle step apparatus according to an embodiment of the present invention.

The first permanent magnet direct current motor 30a is mounted on the first mounting bracket 11a, and the second permanent magnet direct current motor 30b is mounted on the second mounting bracket 11b. As shown in FIG. 5, the first permanent magnet direct current motor 30a has the first motor shaft 32a, and the second permanent magnet direct current motor 30b has the second motor shaft 32b. The first motor shaft 32a of the first permanent magnet direct current motor 30a is coupled with an arm of the first arm assembly 13a, and the second motor shaft 32b of the second permanent magnet direct current motor 30b is coupled with an arm of the second arm assembly 13b.

Figure 6:
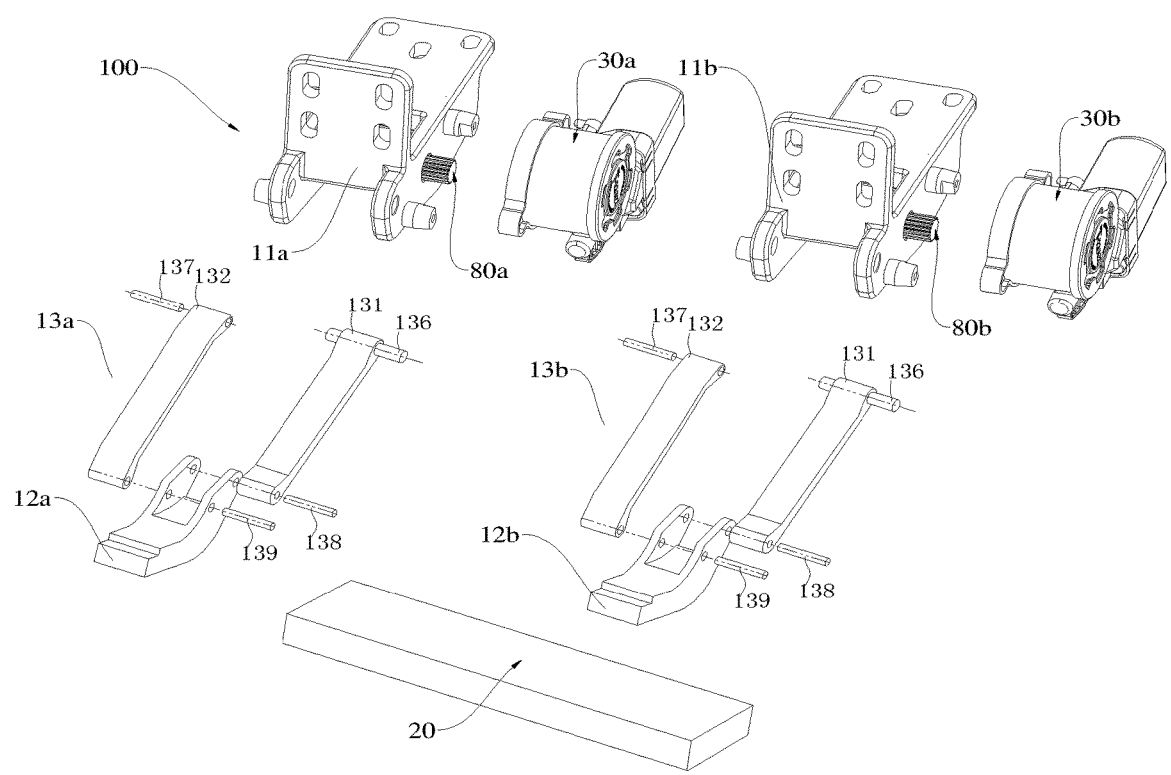
FIG. 6 is an exploded view of a vehicle step apparatus according to an embodiment of the present invention.

As shown in FIG. 6, the vehicle step apparatus 100 further includes a first connection shaft 80a and a second connection shaft 80b. The first connection shaft 80a is coupled with both the first motor shaft 32a and the first arm assembly 13a, and the second connection shaft 80b is coupled with the second motor shaft 32b and the second arm assembly 13b.

In other words, first motor shaft 32a is coupled with the first arm assembly 13a via a first connection shaft 80a, and the second motor shaft 32b is coupled with the second arm assembly 13b via a second connection shaft 80b.

Alternatively, the first extending and retracting device 10a is configured in the form of four-link mechanism 10a1, five-link mechanism 10a2 or six-link mechanism 10a3, and the second extending and retracting device 10b is configured in the form of the four-link mechanism 10a1, five-link mechanism 10a2 or six-link mechanism 10a3.

It can be understood that a structure of the second extending and retracting device 10b may be the same as that of the first extending and retracting device 10a. Thus, the first extending and retracting device 10a will be described below, and the second extending and retracting device 10b will be omitted here.

Figure 2:
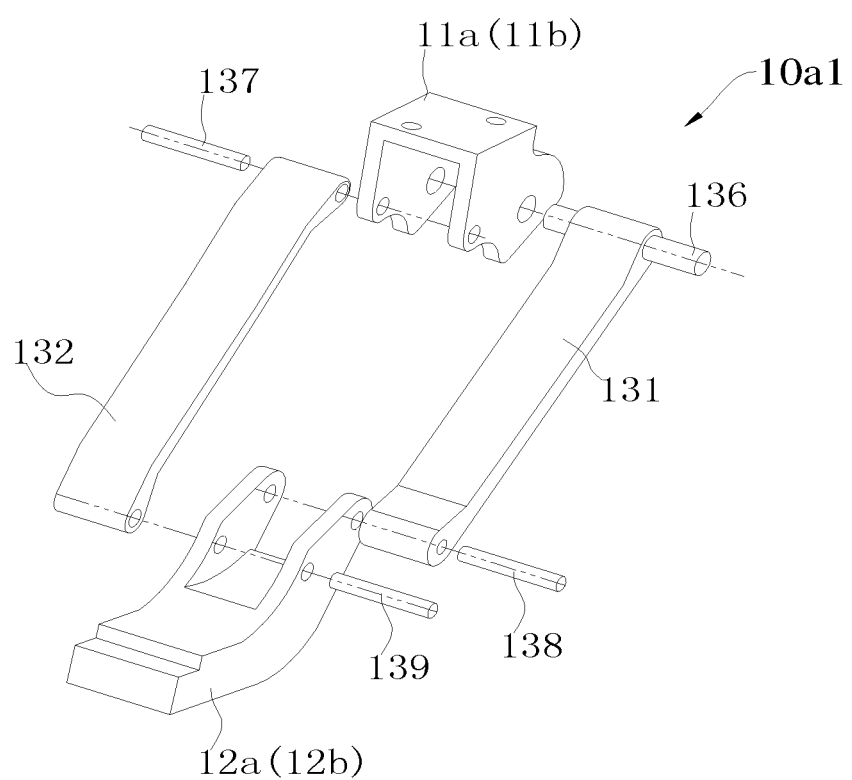
FIG. 2 is a schematic view of a first extending and retracting device and a second extending and retracting device of a vehicle step apparatus according to an embodiment of the present invention, in which both the first extending and retracting device and the second extending and retracting device are in the form of four-link mechanism.

In an embodiment shown in FIG. 2, the first extending and retracting device 10a is in the form of four-link mechanism 10a1, and includes the first mounting bracket 11a, the first step bracket 12a and the first arm assembly 13a. The first arm assembly 13a is coupled between the first mounting bracket 11a and the first step bracket 12a, and includes a first arm 131 and a second arm 132.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138, and a second end (a lower end) of the second arm 132 is pivotally coupled with the first step bracket 12a via a fourth connection pin 139.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

Figure 3:
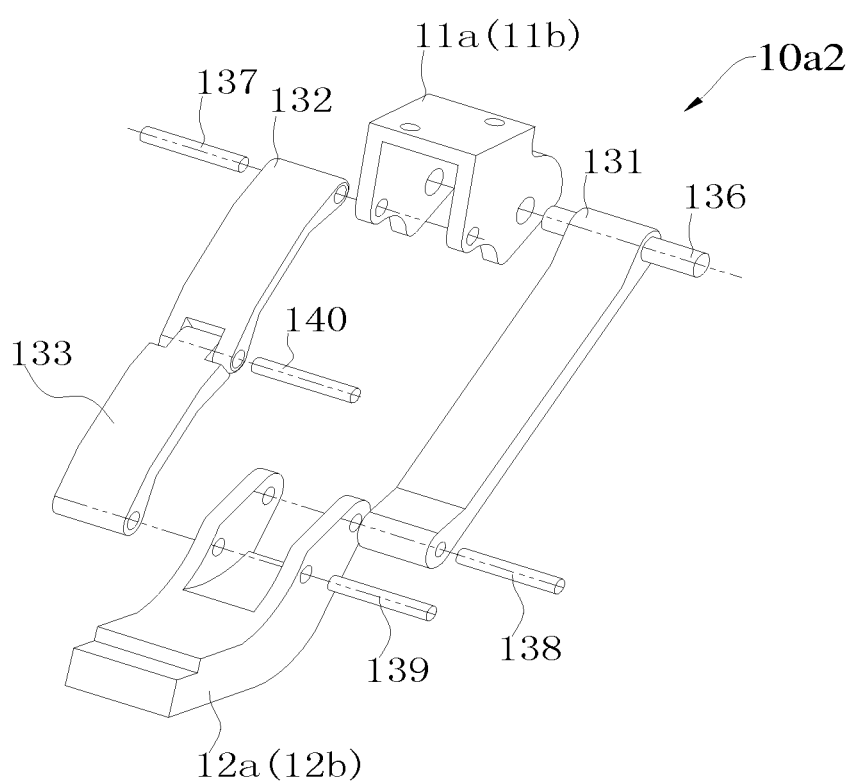
FIG. 3 is a schematic view of a first extending and retracting device and a second extending and retracting device of a vehicle step apparatus according to an embodiment of the present invention, in which both the first extending and retracting device and the second extending and retracting device are in the form of five-link mechanism.

In an embodiment shown in FIG. 3, the first extending and retracting device 10a is in the form of five-link mechanism 10a2, and includes the first mounting bracket 11a, the first step bracket 12a and the first arm assembly 13a. The first arm assembly 13a is coupled between the first mounting bracket 11a and the first step bracket 12a, and includes a first arm 131, a second arm 132 and a third arm 133.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138, and a second end (a lower end) of the second arm 132 is pivotally coupled with a first end (an upper end) of the third arm 133 via a fifth connection pin 140. A second end (a lower end) of the third arm 133 is pivotally coupled with the first step bracket 12a via a fourth connection pin 139.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

Figure 4:
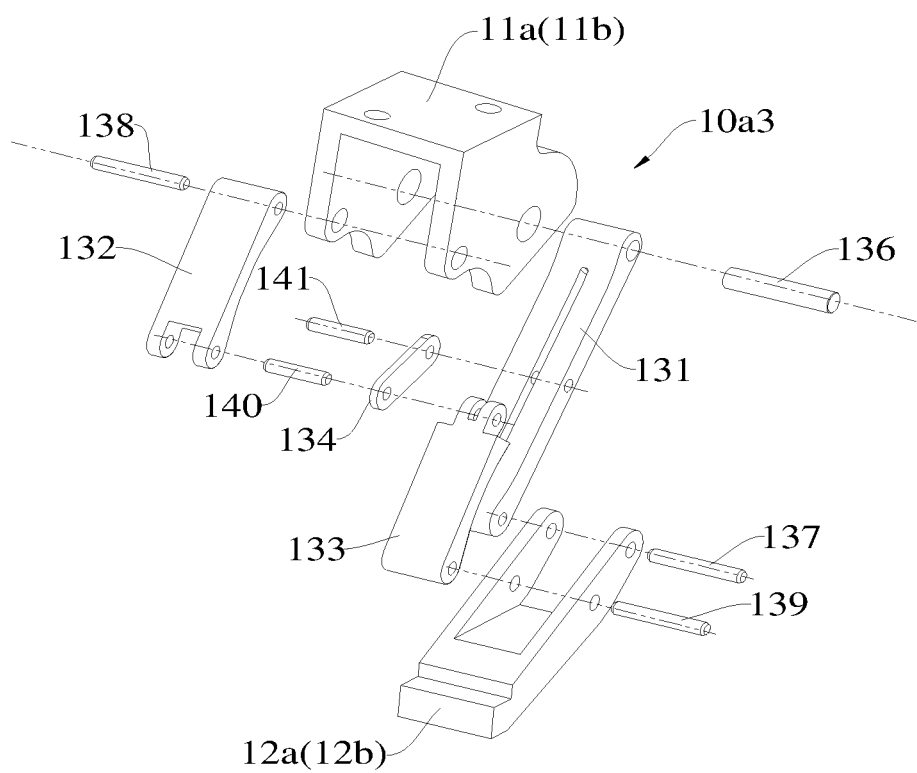
FIG. 4 is a schematic view of a first extending and retracting device and a second extending and retracting device of a vehicle step apparatus according to an embodiment of the present invention, in which both the first extending and retracting device and the second extending and retracting device are in the form of six-link mechanism.

In an embodiment shown in FIG. 4, the first extending and retracting device 10a is in the form of six-link mechanism 10a3, and includes the first mounting bracket 11a, the first step bracket 12a and the first arm assembly 13a. The first arm assembly 13a is coupled between the first mounting bracket 11a and the first step bracket 12a, and includes a first arm 131, a second arm 132, a third arm 133 and a fourth arm 134.

A first end (an upper end) of the first arm 131 is pivotally coupled with the first mounting bracket 11a via a first connection pin 136, and a second end (a lower end) of the first arm 131 is pivotally coupled with the first step bracket 12a via a second connection pin 137. A first end (an upper end) of the second arm 132 is pivotally coupled with the first mounting bracket 11a via a third connection pin 138.

A first end (an upper end) of the third arm 133 is pivotally coupled with a second end (a lower end) of the second arm 132 via a fifth connection pin 140, and a second end (a lower end) of the third arm 133 is pivotally coupled with the first step bracket 12a via a fourth connection pin 139. A first end of the fourth arm 134 is pivotally coupled with both of the second end of the second arm 132 and the first end of the third arm 133, and a second end of the fourth arm 134 is pivotally coupled with a middle portion of the first arm 131 via a sixth connection pin 141.

The first motor shaft 32a of the first permanent magnet direct current motor 30a is coupled with one of the first arm 131 and the second arm 132. Thus, the first motor shaft 32a drives the one of the first arm 131 and the second arm 132 to rotate, thereby drives the first step bracket 12a to extend and retract.

The vehicle step apparatus according to other embodiments of the present invention will be described with reference to FIG. 7 and FIG. 8. The difference between the vehicle step apparatus according to other embodiments and the above-mentioned vehicle step apparatus 100 will be described in detail.

In some other embodiments, the vehicle step apparatus 100 includes the first extending and retracting device 10a, the second extending and retracting device 10b, the step 20, the first permanent magnet direct current motor 30a, the second permanent magnet direct current motor 30b, a first elastic member 50a and a second elastic member 50b.

The first elastic member 50a is configured to elastically deform so as to store energy when the first permanent magnet direct current motor 30a drives the first step bracket 12a to move towards the first extending position, and to release energy so as to assist the first permanent magnet direct current motor 30a to drive the first extending and retracting device 10a, i.e. to drive the first step bracket 12a, when the first permanent magnet direct current motor 30a drives the first step bracket 12a to move towards the first retracting position.

The second elastic member 50b is configured to elastically deform so as to store energy when the second permanent magnet direct current motor 30b drives the second step bracket 12b to move towards the second extending position, and to release energy so as to assist the second permanent magnet direct current motor 30b to drive the second extending and retracting device 10b, i.e. to drive the second step bracket 12b, when the second permanent magnet direct current motor 30b drives the second step bracket 12b to move towards the second retracting position.

The load of the first permanent magnet direct current motor 30a during driving the step 20 to retract is bigger than that of the first permanent magnet direct current motor 30a during driving the step 20 to extend, so that the working current of the first permanent magnet direct current motor 30a during driving the step 20 to retract is larger than that of the first permanent magnet direct current motor 30a during driving the step 20 to extend.

The load of the second permanent magnet direct current motor 30b during driving the step 20 to retract is bigger than that of the second permanent magnet direct current motor 30b during driving the step 20 to extend, so that the working current of the second permanent magnet direct current motor 30b during driving the step 20 to retract is larger than that of the second permanent magnet direct current motor 30b during driving the step 20 to extend.

For the vehicle step apparatus, when the step 20 is extended, the first motor shaft 32a drives the first elastic member 50a to move and the second motor shaft 32b drives the second elastic member 50b to move. Thus, both the first elastic member 50a and the second elastic member 50b are caused to be elastically deformed so as to store energy.

When the step 20 is retracted, the first elastic member 50a releases energy to assist the first permanent magnet direct current motor 30a in driving the first extending and retracting device 10a, so that the load and the working current of the first permanent magnet direct current motor 30a are decreased during driving the step 20 to retract. The second elastic member 50b releases energy to assist the second permanent magnet direct current motor 30b in driving the second extending and retracting device 10b, so that the load and the working current of the second permanent magnet direct current motor 30b are decreased during driving the step 20 to retract.

Thus, the working current of the first permanent magnet direct current motor 30a in the processes of driving the step 20 to retract is generally consistent with that of the first permanent magnet direct current motor 30a in the processes of driving the step 20 to extend, and the working current of the second permanent magnet direct current motor 30b in the processes of driving the step 20 to retract is generally consistent with that of the second permanent magnet direct current motor 30b in the processes of driving the step 20 to extend. Thus, the first permanent magnet direct current motor 30a and the second permanent magnet direct current motor 30b are protected effectively, and the working life of the first permanent magnet direct current motor 30a and that of the second permanent magnet direct current motor 30b are prolonged.

In some embodiments, the first elastic member 50a includes a first scroll spring, and the second elastic member 50b includes a second scroll spring. A first end 51a of the first scroll spring is fixed, and a second end 52a of the first scroll spring is driven by the first motor shaft 32a of the first permanent magnet direct current motor 30a so as to twist. A first end 51b of the second scroll spring is fixed, and a second end 52b of the second scroll spring is driven by the second motor shaft 32b of the second permanent magnet direct current motor 30b so as to twist.

Figure 7:
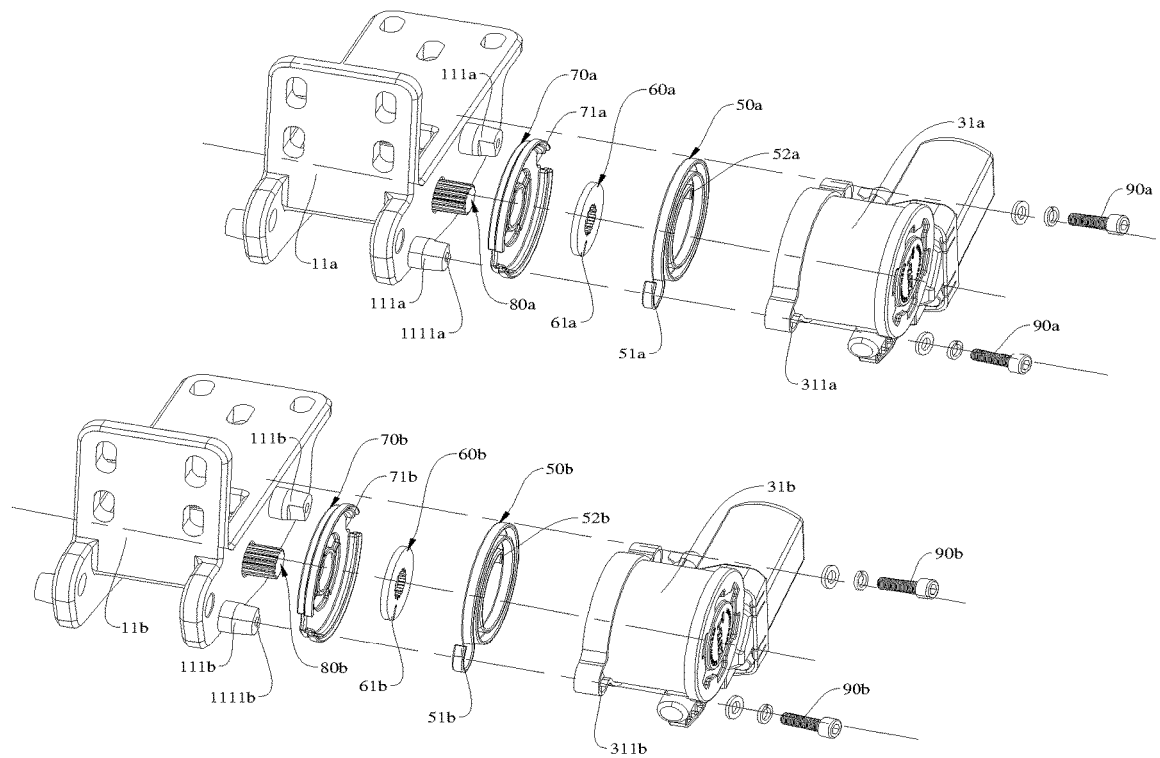
FIG. 7 is a partial exploded view of a vehicle step apparatus according to an embodiment of the present invention.
Figure 8:
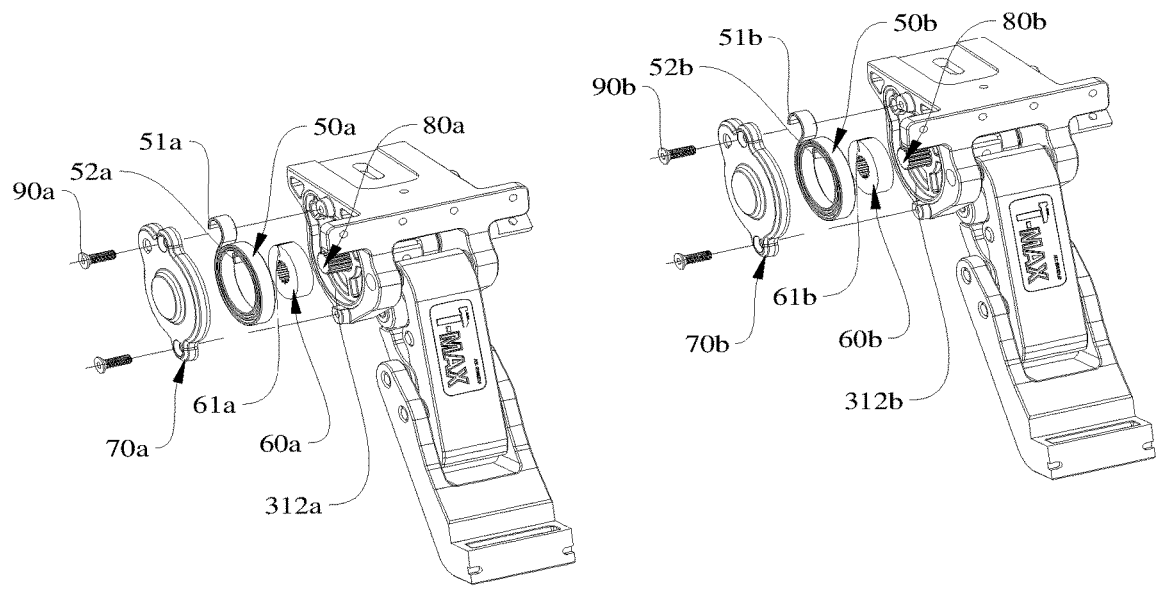
FIG. 8 is a partial exploded view of a vehicle step apparatus according to an embodiment of the present invention.

As shown in FIG. 7 and FIG. 8, an end of the outermost ring of the first scroll spring is bent outwards to form the first end 51a, and an end of an innermost ring of the first scroll spring is bent inwards to form the second end 52a. The first end 51a includes the end of the outermost ring of the first scroll spring and a portion of the outermost ring coupled with the end of the outermost ring. The second end 52a includes the end of the innermost ring of the first scroll spring and a portion of the innermost ring coupled with the end of the innermost ring.

An end of the outermost ring of the second scroll spring is bent outwards to form the first end 51b, and an end of an innermost ring of the second scroll spring is bent inwards to form the second end 52b. The first end 51b includes the end of the outermost ring of the second scroll spring and a portion of the outermost ring coupled with the end of the outermost ring. The second end 52b includes the end of the innermost ring of the second scroll spring and a portion of the innermost ring coupled with the end of the innermost ring.

When the step 20 is extended, the first end 51a of the first scroll spring and the first end 51b of the second scroll spring are fixed, and the second end 52a of the first scroll spring rotates along with the first motor shaft 32a and is twisted tightly to store energy, and the second end 52b of the second scroll spring rotates along with the second motor shaft 32b and is twisted tightly to store energy.

When the step 20 is retracted, the first end 51a of the first scroll spring and the first end 51b of the second scroll spring are fixed, and the second end 52a of the first scroll spring rotates along with the first motor shaft 32a and releases energy so as to assist the first permanent magnet direct current motor 30a to drive the first extending and retracting device 10a to retract, and the second end 52b of the second scroll spring rotates along with the second motor shaft 32b and releases energy so as to assist the second permanent magnet direct current motor 30b to drive the second extending and retracting device 10b to retract.

However, the present invention is not limited to this, both the first elastic member 50a and the second elastic member 50b may be a spring leaf, a disk spring or other units or parts easy to be deformed elastically.

As shown in FIG. 7 and FIG. 8, the vehicle step apparatus 100 further includes a first cover 70a, a first connection plate 60a, a second cover 70b and a second connection plate 60b.

A first recess 312a is formed in a first motor casing 31a of the first permanent magnet direct current motor 30a, and the first cover 70a covers the first recess 312a to define a first cavity. The first connection plate 60a is mounted within the first cavity and driven by the first motor shaft 32a of the first permanent magnet direct current motor 30a to rotate. The first scroll spring is mounted within the first cavity, the first end 51a of the first scroll spring is fixed in the first cover 70a, and the second end 52a of the first scroll spring is coupled with the first connection plate 60a.

A second recess 312b is formed in a second motor casing 31b of the second permanent magnet direct current motor 30b, and the second cover 70b covers the second recess 312b to define a second cavity. The second connection plate 60b is mounted within the second cavity and driven by the second motor shaft 32b of the second permanent magnet direct current motor 30b to rotate. The second scroll spring is mounted within the second cavity, the first end 51b of the second scroll spring is fixed in the second cover 70b, and the second end 52b of the second scroll spring is coupled with the second connection plate 60b.

As shown in FIG. 7 and FIG. 8, the first cover 70a is detachably fastened to the first motor casing 31a of the first permanent magnet direct current motor 30a. A first limitation notch 71a is formed in the first cover 70a, a first limitation column 111a is formed on the first mounting bracket 11a, the first limitation column 111a is fitted within the first limitation notch 71a to mount the first cover 70a on the first mounting bracket 11a. The first end 51a of the first scroll spring is fitted over the first limitation column 111a.

The second cover 70b is detachably fastened to the second motor casing 31b of the second permanent magnet direct current motor 30b. A second limitation notch 71b is formed in the second cover 70b, a second limitation column 111b is formed on the second mounting bracket 11b, the second limitation column 111b is fitted within the second limitation notch 71b to mount the second cover 70b on the second mounting bracket 11b. The first end 51b of the second scroll spring is fitted over the second limitation column 111b.

Specifically, the first connection plate 60a is configured as a substantially circular plate. The first connection plate 60a is disposed within the first cavity, and the first connection plate 60a defines a first surface opposing to the first recess 312a and a second surface opposing to the first cover 70a. The first connection plate 60a is coupled with the first motor shaft 32a directly or indirectly, so that the first connection plate 60a can rotate under the drive of the first motor shaft 32a. The first scroll spring is fitted over the first connection plate 60a, and the second end 52a of the first scroll spring is connected to the first connection plate 60a and rotates along with the first connection plate 60a in a same direction.

The second connection plate 60b is configured as a substantially circular plate. The second connection plate 60b is disposed within the second cavity, and the second connection plate 60b defines a first surface opposing to the second recess 312b and a second surface opposing to the second cover 70b. The second connection plate 60b is coupled with the second motor shaft 32b directly or indirectly, so that the second connection plate 60b can rotate under the drive of the second motor shaft 32b. The second scroll spring is fitted over the second connection plate 60b, and the second end 52b of the second scroll spring is connected to the second connection plate 60b and rotates along with the second connection plate 60b in a same direction.

Therefore, the first scroll spring and the second scroll spring can be integrated in the first permanent magnet direct current motor 30a and the second permanent magnet direct current motor 30b respectively so as to decrease transmission loss and make the structure of the vehicle step apparatus 100 more compactly.

The first connection plate 60a, the second connection plate 60b, the first cover 70a, the second cover 70b, the first recess 312a and the second recess 312b may have a circular shape or an oval shape.

A number of each of the first limitation notch 71a, the first limitation column 111a, the second limitation notch 71b and the second limitation column 111b is not limited to two, and when there are more than two first limitation notches 71a and two second limitation notches 71b, the first limitation notches 71a are provided and evenly spaced apart from each other along a circumferential direction of the first cover 70a, and the second limitation notches 71b are provided and evenly spaced apart from each other along a circumferential direction of the second cover 70b.

A first catch groove 61a is formed in an outer circumferential surface of the first connection plate 60a, and the second end 52a of the first scroll spring is inserted into and fitted within the first catch groove 61a. The first connection plate 60a is fitted over the first connection shaft 80a and coupled with the first connection shaft 80a via spline coupling.

A second catch groove 61b is formed in an outer circumferential surface of the second connection plate 60b, and the second end 52b of the second scroll spring is inserted into and fitted within the second catch groove 61b. The second connection plate 60b is fitted over the second connection shaft 80b and coupled with the second connection shaft 80b via spline coupling.

As shown in FIG. 7, the first catch groove 61a extends along a radial direction of the first connection plate 60a, and the second catch groove 61b extends along a radial direction of the second connection plate 60b. A center of each of the first connection plate 60a, the first motor shaft 32a, the second connection plate 60b and the second motor shaft 32b has a spline hole. Each of the first connection shaft 80a and the second connection shaft 80b has an external spline.

The first motor shaft 32a drives the first connection shaft 80a and the first connection plate 60a to rotate, and the second end 52a of the first scroll spring fixed on the first connection plate 60a rotates along with the first connection plate 60a. The second motor shaft 32b drives the second connection shaft 80b and the second connection plate 60b to rotate, and the second end 52b of the second scroll spring fixed on the second connection plate 60b rotates along with the second connection plate 60b.

Thus, the first scroll spring and the second scroll spring are gradually rolled up tightly, thus resulting in a simple and compact structure. In addition, the first connection shaft 80a is coupled with the first motor shaft 32a and the first connection plate 60a via spline connection so as to ensure driving force transmission and make installation and disassembly to be easy, and the second connection shaft 80b is coupled with the second motor shaft 32b and the second connection plate 60b via spline connection so as to ensure driving force transmission and make installation and disassembly to be easy.

As shown in FIG. 7, a first mounting hole 311a is formed in the first motor casing 31a, and the first limitation column 111a is passed through the first mounting hole 311a. A first threaded hole 1111a is formed in the first limitation column 111a, and the first permanent magnet direct current motor 30a is mounted on the first mounting bracket 11a via a first bolt 90a fitted within the first threaded hole 1111a.

A second mounting hole 311b is formed in the second motor casing 31b, and the second limitation column 111b is passed through the second mounting hole 311b. A second threaded hole 1111b is formed in the second limitation column 111b, and the second permanent magnet direct current motor 30b is mounted on the second mounting bracket 11b via a second bolt 90b fitted within the second threaded hole 1111b.

The first limitation column 111a is passed through the first limitation notch 71a and bears against the first motor casing 31a. The first mounting hole 311a of the first motor casing 31a is opposite to the first threaded hole 1111a of the first limitation column 111a. The first bolt 90a is passed through the first mounting hole 311a and is fitted within the first threaded hole 1111a so as to mount the first motor casing 31a to the first mounting bracket 11a.

The second limitation column 111b is passed through the second limitation notch 71b and bears against the second motor casing 31b. The second mounting hole 31b of the second motor casing 31b is opposite to the second threaded hole 1111b of the second limitation column 111b. The second bolt 90b is passed through the second mounting hole 311b and is fitted within the second threaded hole 1111b so as to mount the second motor casing 31b to the second mounting bracket 11b.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A vehicle step apparatus, comprising:
   a first extending and retracting device comprising a first mounting bracket, a first step bracket, and a first arm assembly coupled between the first mounting bracket and the first step bracket and configured to drive the first step bracket to move between a first extending position and a first retracting position;
   a second extending and retracting device comprising a second mounting bracket, a second step bracket, and a second arm assembly coupled between the second mounting bracket and the second step bracket and configured to drive the second step bracket to move between a second extending position and a second retracting position;
   a step mounted on the first step bracket and the second step bracket;
   a first permanent magnet direct current motor mounted on the first mounting bracket and coupled with the first arm assembly to drive the first arm assembly;
   a second permanent magnet direct current motor mounted on the second mounting bracket and coupled with the second arm assembly to drive the second arm assembly;
   a first elastic member configured to elastically deform so as to store energy when the first permanent magnet direct current motor drives the first step bracket to move towards the first extending position, and to release energy so as to assist the first permanent magnet direct current motor to drive the first extending and retracting device when the first permanent magnet direct current motor drives the first step bracket to move towards the first retracting position; and
   a second elastic member configured to elastically deform so as to store energy when the second permanent magnet direct current motor drives the second step bracket to move towards the second extending position, and to release energy so as to assist the second permanent magnet direct current motor to drive the second extending and retracting device when the second permanent magnet direct current motor drives the second step bracket to move towards the second retracting position.

2. The vehicle step apparatus as set forth in claim 1, wherein a first motor shaft of the first permanent magnet direct current motor is coupled with the first arm assembly via a first connection shaft, and
   wherein a second motor shaft of the second permanent magnet direct current motor is coupled with the second arm assembly via a second connection shaft.

3. The vehicle step apparatus as set forth in claim 1, wherein the first extending and retracting device is configured in the form of one of four-link mechanism, five-link mechanism and six-link mechanism, and the second extending and retracting device is configured in the form of one of the four-link mechanism, five-link mechanism and six-link mechanism.

4. The vehicle step apparatus as set forth in claim 3, wherein the first extending and retracting device is in the form of four-link mechanism, and the first arm assembly comprises:
  a first arm defining a first end pivotally coupled with the first mounting bracket, and a second end pivotally coupled with the first step bracket; and
  a second arm defining a first end pivotally coupled with the first mounting bracket, and a second end pivotally coupled with the first step bracket,
  wherein the first permanent magnet direct current motor is coupled with one of the first arm and the second arm.

5. The vehicle step apparatus as set forth in claim 3, wherein the first extending and retracting device is in the form of five-link mechanism, and the first arm assembly comprises:
  a first arm defining a first end pivotally coupled with the first mounting bracket, and a second end pivotally coupled with the first step bracket;
  a second arm defining a first end pivotally coupled with the first mounting bracket, and a second end; and
  a third arm defining a first end pivotally coupled with the second end of the second arm, and a second end pivotally coupled with the first step bracket,
  wherein the first permanent magnet direct current motor is coupled with one of the first arm and the second arm.

6. The vehicle step apparatus as set forth in claim 3, wherein the first extending and retracting device is in the form of six-link mechanism, and the first arm assembly comprises:
  a first arm defining a first end pivotally coupled with the first mounting bracket, and a second end pivotally coupled with the first step bracket;
  a second arm defining a first end pivotally coupled with the first mounting bracket, and a second end;
  a third arm defining a first end pivotally coupled with the second end of the second arm, and a second end pivotally coupled with the first step bracket; and
  a fourth arm defining a first end pivotally coupled with both of the second end of the second arm and the first end of the third arm, and a second end pivotally coupled with a middle portion of the first arm,
  wherein the first permanent magnet direct current motor is coupled with one of the first arm and the second arm.

7. The vehicle step apparatus as set forth in claim 1,
  wherein the first elastic member comprises a first scroll spring defining a fixed first end and a second end driven by the first motor shaft of the first permanent magnet direct current motor so as to twist;
  wherein the second elastic member comprises a second scroll spring defining a fixed first end and a second end driven by the second motor shaft of the second permanent magnet direct current motor so as to twist.

8. A vehicle step apparatus, comprising:
  a first extending and retracting device comprising a first mounting bracket, a first step bracket, and a first arm assembly coupled between the first mounting bracket and the first step bracket and configured to drive the first step bracket to move between a first extending position and a first retracting position;
  a second extending and retracting device comprising a second mounting bracket, a second step bracket, and a second arm assembly coupled between the second mounting bracket and the second step bracket and configured to drive the second step bracket to move between a second extending position and a second retracting position;
  a step mounted on the first step bracket and the second step bracket;
  a first permanent magnet direct current motor mounted on the first mounting bracket and coupled with the first arm assembly to drive the first arm assembly;
  a second permanent magnet direct current motor mounted on the second mounting bracket and coupled with the second arm assembly to drive the second arm assembly;
  a first elastic member configured to elastically deform so as to store energy when the first permanent magnet direct current motor drives the first step bracket to move towards the first extending position, and to release energy so as to assist the first permanent magnet direct current motor to drive the first extending and retracting device when the first permanent magnet direct current motor drives the first step bracket to move towards the first retracting position; and
  a second elastic member configured to elastically deform so as to store energy when the second permanent magnet direct current motor drives the second step bracket to move towards the second extending position, and to release energy so as to assist the second permanent magnet direct current motor to drive the second extending and retracting device when the second permanent magnet direct current motor drives the second step bracket to move towards the second retracting position;
  wherein the first elastic member comprises a first scroll spring defining a fixed first end and a second end driven by the first motor shaft of the first permanent magnet direct current motor so as to twist;
  wherein the second elastic member comprises a second scroll spring defining a fixed first end and a second end driven by the second motor shaft of the second permanent magnet direct current motor so as to twist;
  wherein the vehicle step apparatus further comprises:
  a first cover and a first connection plate, wherein a first recess is formed in a casing of the first permanent magnet direct current motor, and the first cover covers the first recess to define a first cavity, the first connection plate is mounted within the first cavity and driven by the first motor shaft of the first permanent magnet direct current motor to rotate, wherein the first scroll spring is mounted within the first cavity, the first end of the first scroll spring is fixed in the first cover, and the second end of the first scroll spring is coupled with the first connection plate; and
  a second cover and a second connection plate, wherein a second recess is formed in a casing of the second permanent magnet direct current motor, and the second cover covers the second recess to define a second cavity, the second connection plate is mounted within the second cavity and driven by the second motor shaft of the second permanent magnet direct current motor to rotate, wherein the second scroll spring is mounted within the second cavity, the first end of the second scroll spring is fixed in the second cover, and the second end of the second scroll spring is coupled with the second connection plate.

9. The vehicle step apparatus as set forth in claim 8, wherein the first cover is detachably fastened to the casing of the first permanent magnet direct current motor, a first limitation notch is formed in the first cover, a first limitation column is formed on the first mounting bracket, the first limitation column is fitted within the first limitation notch to mount the first cover on the first mounting bracket, and the first end of the first scroll spring is fitted over the first limitation column;

wherein the second cover is detachably fastened to the casing of the second permanent magnet direct current motor, a second limitation notch is formed in the second cover, a second limitation column is formed on the second mounting bracket, the second limitation column is fitted within the second limitation notch to mount the second cover on the second mounting bracket, and the first end of the second scroll spring is fitted over the second limitation column.

10. The vehicle step apparatus as set forth in claim 9, wherein a first mounting hole is formed in the casing of the first permanent magnet direct current motor, and the first limitation column is passed through the first mounting hole, a first threaded hole is formed in the first limitation column, and the first permanent magnet direct current motor is mounted on the first mounting bracket via a first bolt fitted within the first threaded hole;

wherein a second mounting hole is formed in the casing of the second permanent magnet direct current motor, and the second limitation column is passed through the second mounting hole, a second threaded hole is formed in the second limitation column, and the second permanent magnet direct current motor is mounted on the second mounting bracket via a second bolt fitted within the second threaded hole.

11. The vehicle step apparatus as set forth in claim 8, wherein a first catch groove is formed in an outer circumferential surface of the first connection plate, and the second end of the first scroll spring is inserted into and fitted within the first catch groove;

wherein a second catch groove is formed in an outer circumferential surface of the second connection plate, and the second end of the second scroll spring is inserted into and fitted within the second catch groove.

12. A vehicle, comprising:

a first extending and retracting device comprising a first mounting bracket, a first step bracket, and a first arm assembly coupled between the first mounting bracket and the first step bracket and configured to drive the first step bracket to move between a first extending position and a first retracting position;

a second extending and retracting device comprising a second mounting bracket, a second step bracket, and a second arm assembly coupled between the second mounting bracket and the second step bracket and configured to drive the second step bracket to move between a second extending position and a second retracting position;

a step mounted on the first step bracket and the second step bracket;

a first permanent magnet direct current motor mounted on the first mounting bracket and having a first motor shaft coupled with the first arm assembly;

a second permanent magnet direct current motor mounted on the second mounting bracket and having a second motor shaft coupled with the second arm assembly;

a first elastic member configured to elastically deform so as to store energy when the first permanent magnet direct current motor drives the first step bracket to move towards the first extending position, and to release energy so as to assist the first permanent magnet direct current motor to drive the first extending and retracting device when the first permanent magnet direct current motor drives the first step bracket to move towards the first retracting position; and a second elastic member configured to elastically deform so as to store energy when the second permanent magnet direct current motor drives the second step bracket to move towards the second extending position, and to release energy so as to assist the second permanent magnet direct current motor to drive the second extending and retracting device when the second permanent magnet direct current motor drives the second step bracket to move towards the second retracting position.

* * * * *